United States Patent
Farahani

(10) Patent No.: US 8,541,974 B2
(45) Date of Patent: Sep. 24, 2013

(54) MOVABLE MAGNETICALLY RESONANT ANTENNA FOR WIRELESS CHARGING

(75) Inventor: Shahin Farahani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 484 days.

(21) Appl. No.: 12/856,540

(22) Filed: Aug. 13, 2010

(65) Prior Publication Data
US 2011/0062916 A1 Mar. 17, 2011

Related U.S. Application Data

(60) Provisional application No. 61/243,442, filed on Sep. 17, 2009.

(51) Int. Cl.
*H02J 7/00* (2006.01)
*H04B 5/00* (2006.01)

(52) U.S. Cl.
USPC .......................................... 320/108; 455/41.1

(58) Field of Classification Search
USPC ..... 455/41.1, 343.1–343.6, 573; 355/538.16, 355/854.6, 854.8, 870.31; 320/108
See application file for complete search history.

(56) References Cited

U.S. PATENT DOCUMENTS

| | | | |
|---|---|---|---|
| 6,756,697 B2 * | 6/2004 | Mizutani et al. | 307/10.1 |
| 7,750,851 B2 * | 7/2010 | Washiro | 343/700 MS |
| 7,826,873 B2 * | 11/2010 | Telefus | 455/573 |
| 7,894,770 B2 * | 2/2011 | Washiro | 455/41.1 |
| 8,102,147 B2 * | 1/2012 | Jung | 320/108 |
| 8,120,317 B2 * | 2/2012 | Sip | 320/108 |
| 2005/0122058 A1 | 6/2005 | Baarman et al. | |

FOREIGN PATENT DOCUMENTS
DE 10218124 A1 11/2003
GB 2418306 A 3/2006

OTHER PUBLICATIONS

International Search Report and Written Opinion—PCT/US2010/049378, International Search Authority—European Patent Office—Mar. 21, 2011.

\* cited by examiner

*Primary Examiner* — Richard V Muralidar
(74) *Attorney, Agent, or Firm* — Knobbe Martens Olson & Bear LLP

(57) ABSTRACT

Exemplary embodiments are directed to wireless power. A method may include reorienting at least one transmit antenna to reduce orthogonality with a receive antenna of at least one chargeable electronic device in response to receiving the at least one electronic device in a holder. The method may further include wirelessly transferring power from the at least one transmit antenna to the receive antenna.

36 Claims, 11 Drawing Sheets

MOVABLE MAGNETICALLY RESONANT ANTENNA FOR WIRELESS CHARGING

CLAIM OF PRIORITY UNDER 35 U.S.C. §119

This application claims priority under 35 U.S.C. §119(e) to: U.S. Provisional Patent Application 61/243,442 entitled "SWINGABLE MAGNETICALLY RESONANT ANTENNA FOR WIRELESS CHARGING" filed on Sep. 17, 2009, the disclosure of which is hereby incorporated by reference in its entirety.

BACKGROUND

1. Field

The present invention relates generally to wireless power, and more specifically, to antenna orientation during wireless charging.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

With wireless power transmission, there is a need for systems and methods for transmitting and relaying wireless power with an improved efficiency to receiver devices. There is also a need for adjusting the operating characteristics of the antennas to adapt to different circumstances and optimize power transfer characteristics.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
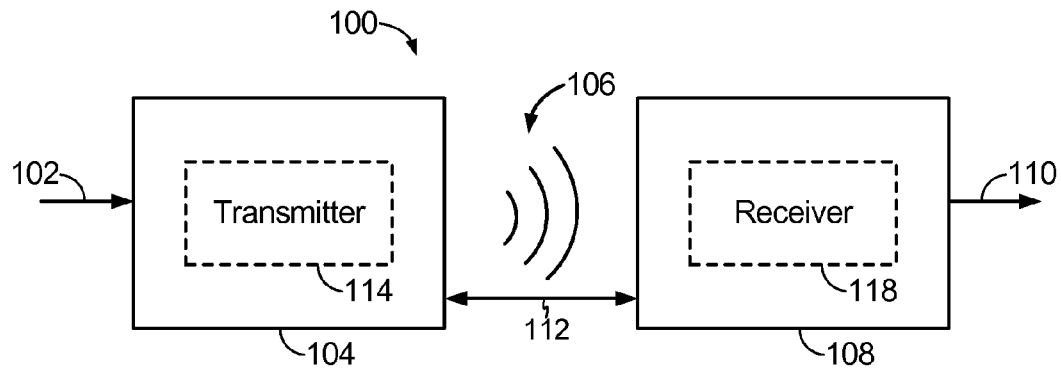
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
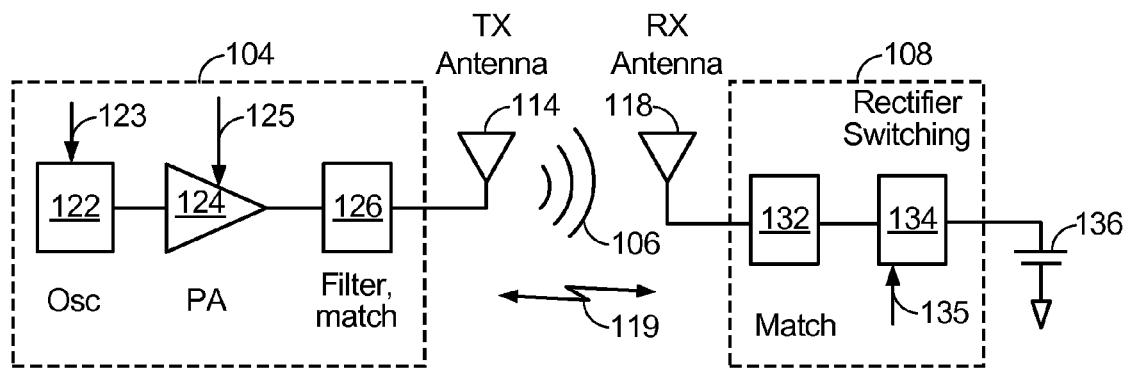
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
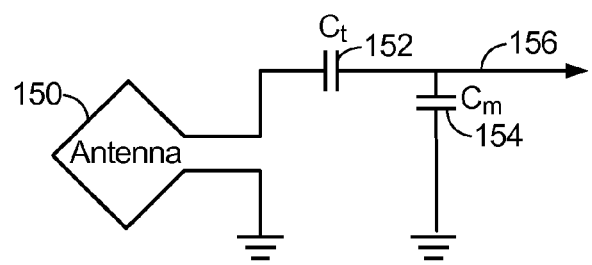
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150. Furthermore, other wireless power coupling modes are further contemplated including induction and other tightly coupled forms of electromagnetic energy propagation.

Figure 4:
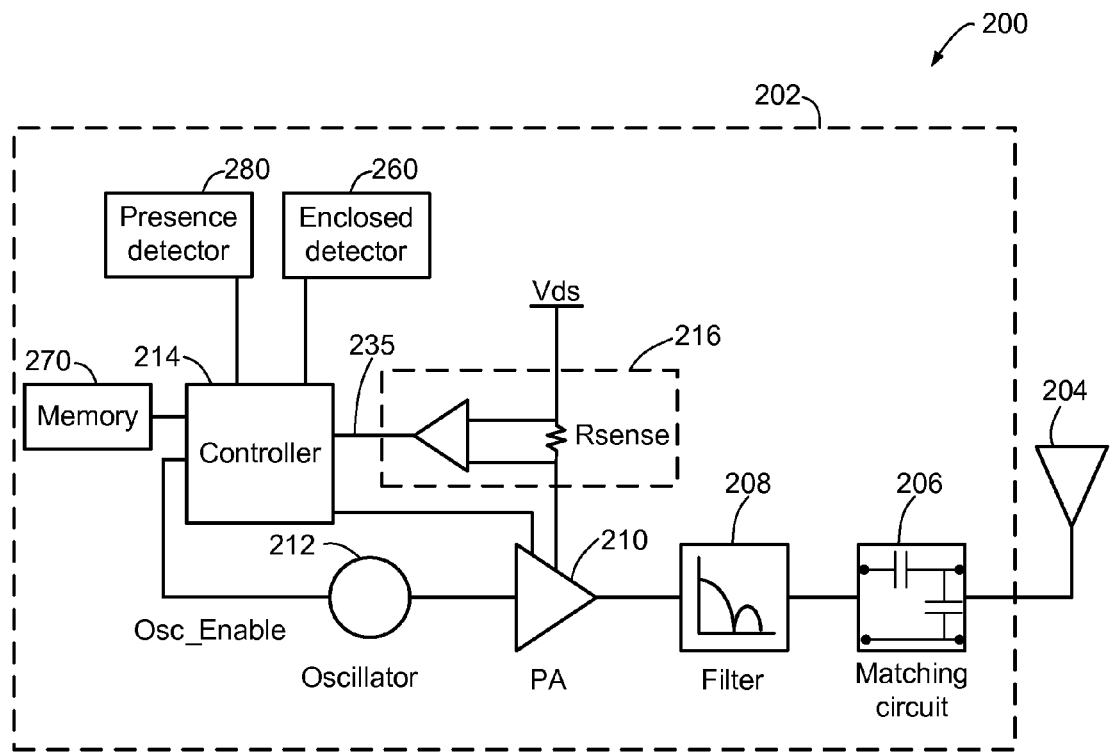
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

Figure 5:
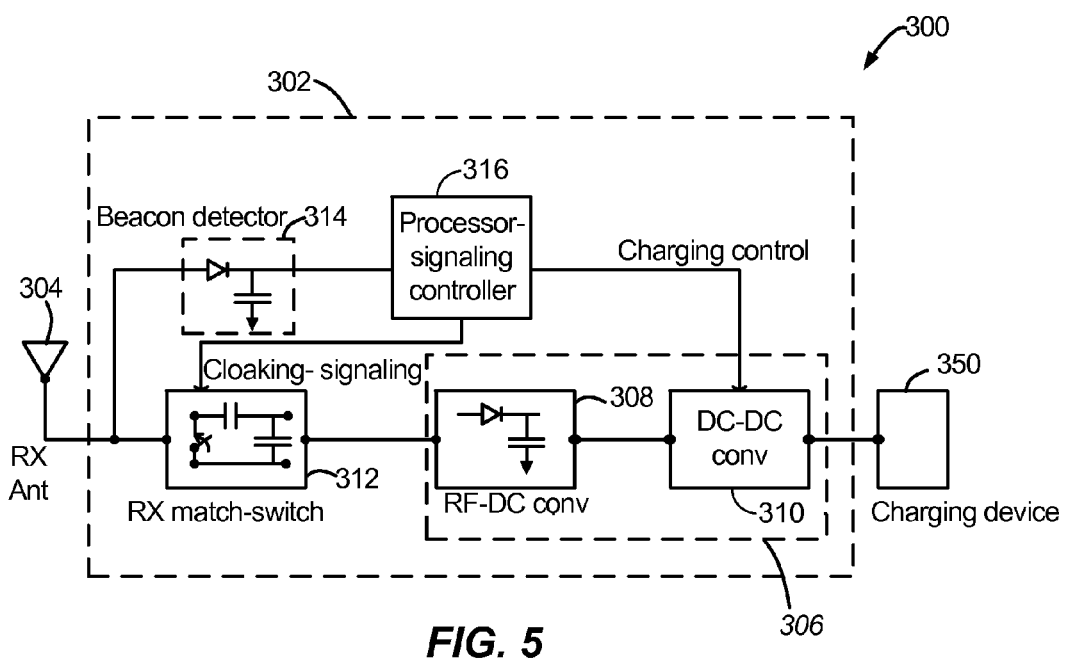
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
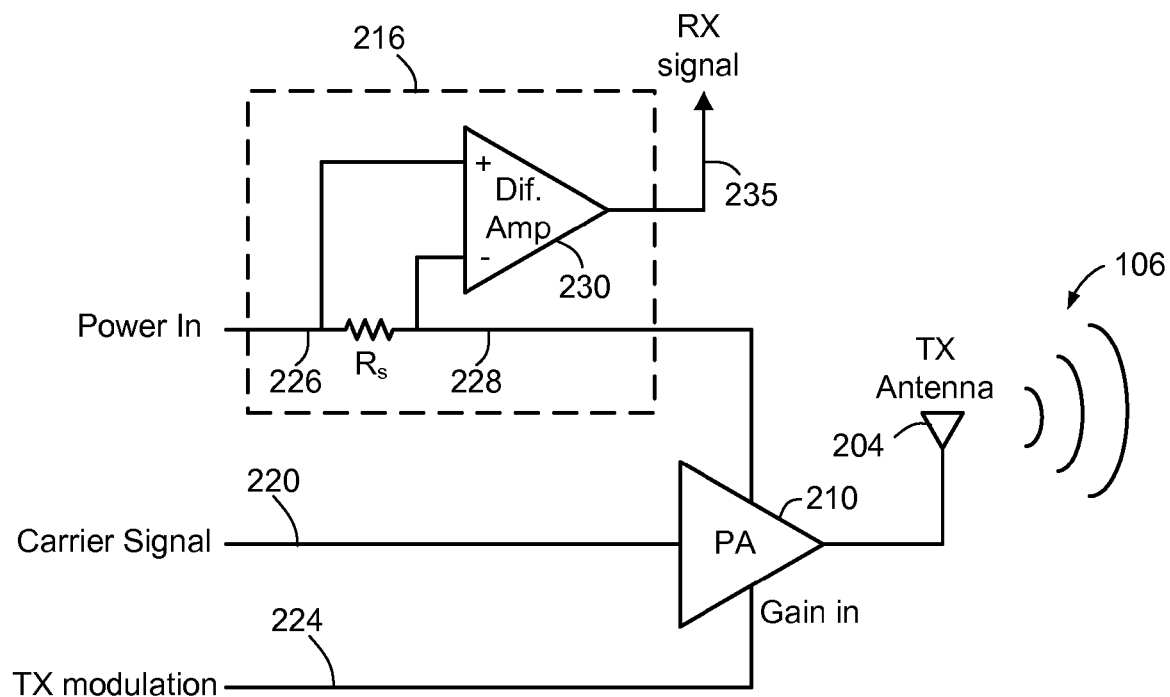
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

A wireless charging system comprises of a transmit module and a receive module. The transmit module may convert a DC signal into an RF signal and deliver it to a magnetically resonant antenna. The receive module is located on the device to be charged and may capture the energy provided by the transmit module, convert it to a DC signal, and deliver it to the rechargeable battery located in the device to be charged. One of the challenges associated with a wireless charging system is the requirement that the receive antenna and transmit antenna can not be separated more that a small distance (e.g., 1 inches). Also, it is expected that the receive and transmit antenna to be relatively in parallel to ensure acceptable power transfer efficiency between the receive and transmit modules.

In some scenarios, it is not possible to lay the device to be charged flatly on the transmit pad. For example, a holder such as a substantially round "cup holder" in a vehicle is a great place to implement a wireless charging system. The user may drop the phone in the cup holder and the phone will be charged by the transmit module and antenna embedded in the cup holder. The problem is that the length of the phone is normally longer than the diameter of the cup holder base, resulting in a phone that is either upright or angled in relationship to the cup holder base. It is very likely that in at least one particular orientation, the wireless charger may not be able to charge the phone properly if at all (e.g., the phone will not be charged if it is close to an upright position). Various solutions may include (1) constraining the receiver placement by industrial design or (2) providing the means of placing the receive and transmit antennas in parallel (e.g., larger transmit pad).

Figure 7A:
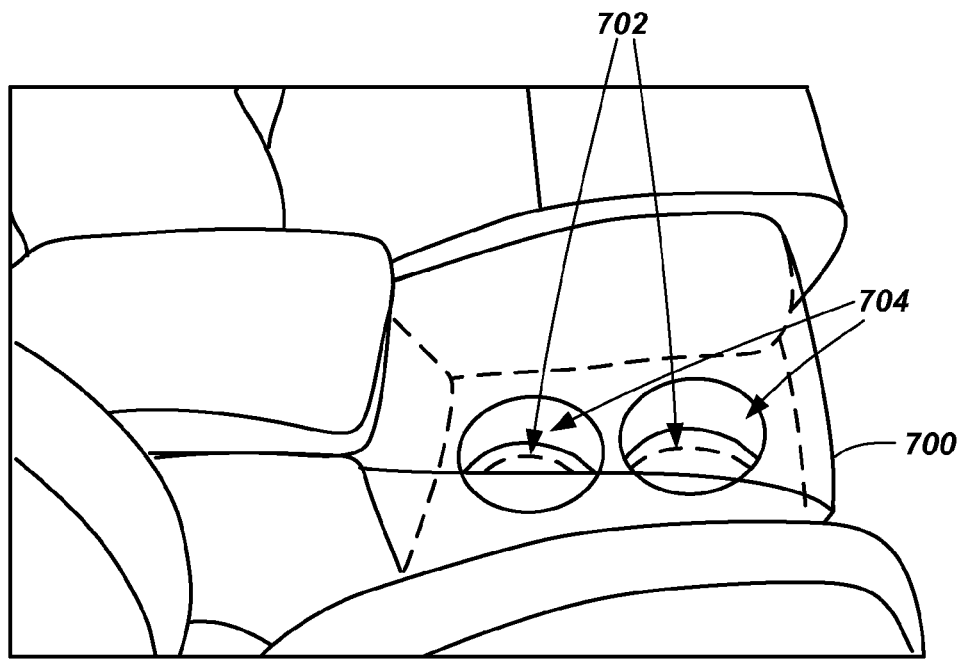
FIG. 7A illustrates an automobile console including a transmit antenna, according to an exemplary embodiment of the present invention.
Figure 7B:
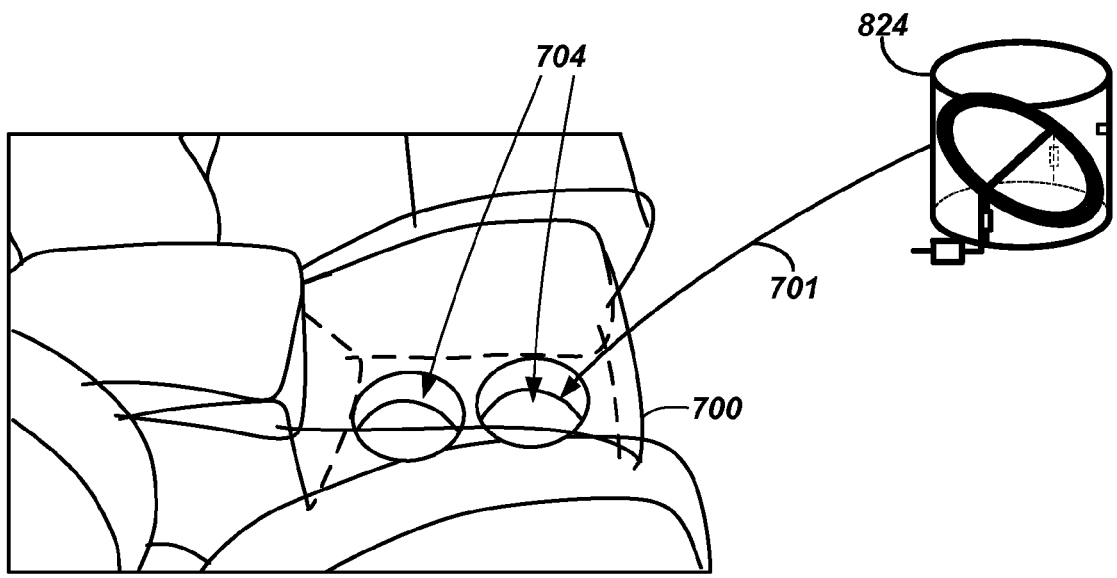
FIG. 7B is an illustration of a plurality of holders of an automobile console and an insertable sleeve for insertion with a holder, according to an exemplary embodiment of the present invention.

FIG. 7A illustrates an exemplary embodiment of antennas 702 in or on, for example, an automobile console 700. While an automobile cup holder is illustrated, any form of cup, container, cavity or other support structure configured in a vehicle, chair, holster, storage location, organizer, etc. is also contemplated by the various exemplary embodiments of the present invention. In these exemplary embodiments, transmit antennas 702 may be originally manufactured as part of the console 700 (i.e., a vehicle element) or the transmit antennas 702 may be disposed on or in the console 700 or retrofit to console 700. Furthermore, with reference to FIG. 7B, a cup holder 824, which is described more fully below, may comprise an insertable sleeve that may be positioned within cup holder 704, as indicated by arrow 701. These exemplary embodiments allow users (i.e., drivers or passengers) to charge electronic devices in a convenient, safe manner while driving. In an exemplary embodiment, the cup holders 704 are in natural locations where many users (i.e., drivers or passengers) already place their portable electronic equipment while driving. Converting the cup holders 704 into wireless charging areas allows consumers to charge their equipment in a natural, convenient manner.

Figure 8:
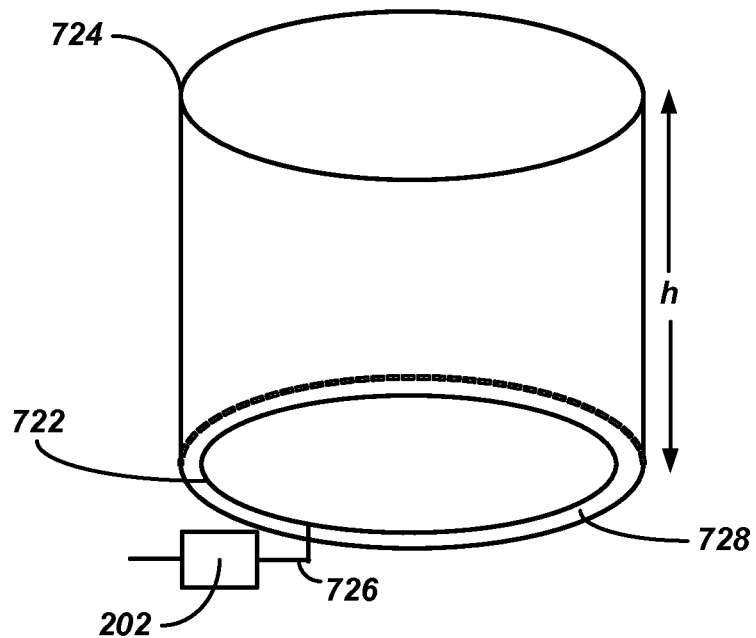
FIG. 8 illustrates a holder including a transmit antenna, in accordance with an exemplary embodiment of the present invention.

As a non-limiting example, antennas 702 may be integrated into a base of a cup holder 704, placed in the bottom of a cup holder 704, or attached to a movable plate, as described herein below, to create a coupling-mode region therein. FIG. 8 illustrates a more detailed perspective view of a cup holder 724 and resident element for facilitating wireless power charging. Transmit antenna 722 is illustrated as being coupled to a feedline 726, which is further coupled to transmit circuitry, such as transmit circuitry 202 of FIG. 4. FIG. 8 illustrates transmit antenna 722 configured about a substantially minor plane 728 substantially parallel to the bottom surface plane of cup holder 724. While not so limited herein, cup holders tend to exhibit a substantially cylindrical form for accommodating devices such as cup that also exhibit a cylindrical form with taller sides than the diameter of the bottom of the cylinder. Cup holder 724 is substantially accommodating to receive and hold other similarly dimensioned devices such as electronic devices configured to be handheld.

Figure 9:
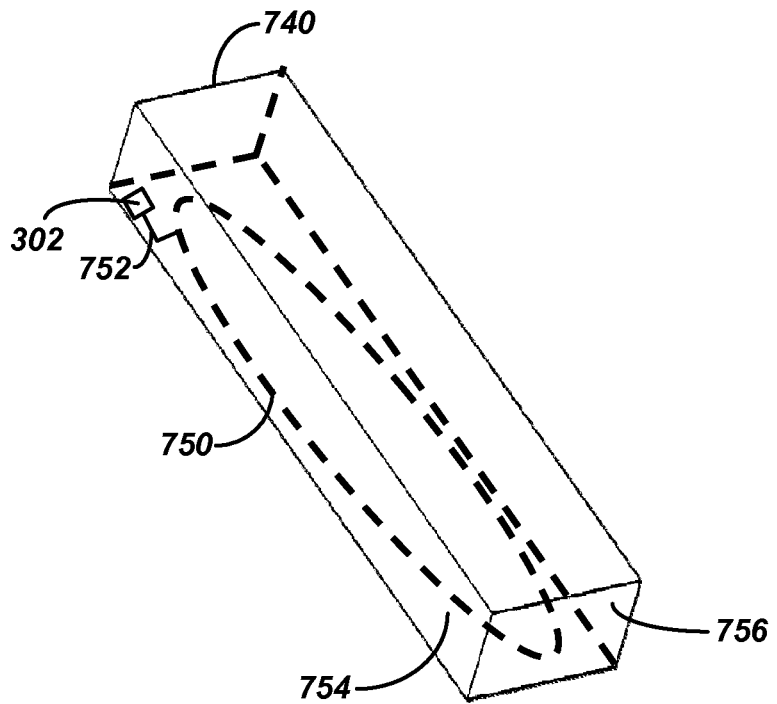
FIG. 9 depicts a chargeable electronic device.

FIG. 9 illustrates an exemplary handheld electronic device 740 such as charging device 350 of FIG. 5, examples of which include cellular telephones, audio-visual devices and the like. Electronic device 740 further includes a receive antenna 750 coupled to a feedline 752 which further couples to receive circuitry 302 of FIG. 5. In attempting to maximize wireless power coupling efficiency, receive antenna 750 is substantially configured along a major plane 754 in order to increase the area of the loop formed by receive antenna 750. Because of the handheld nature of electronic device 740, electronic device 740 further includes a form-factor defined by major dimension along major plane 754 and a minor dimension along minor plane 756.

Figure 10:
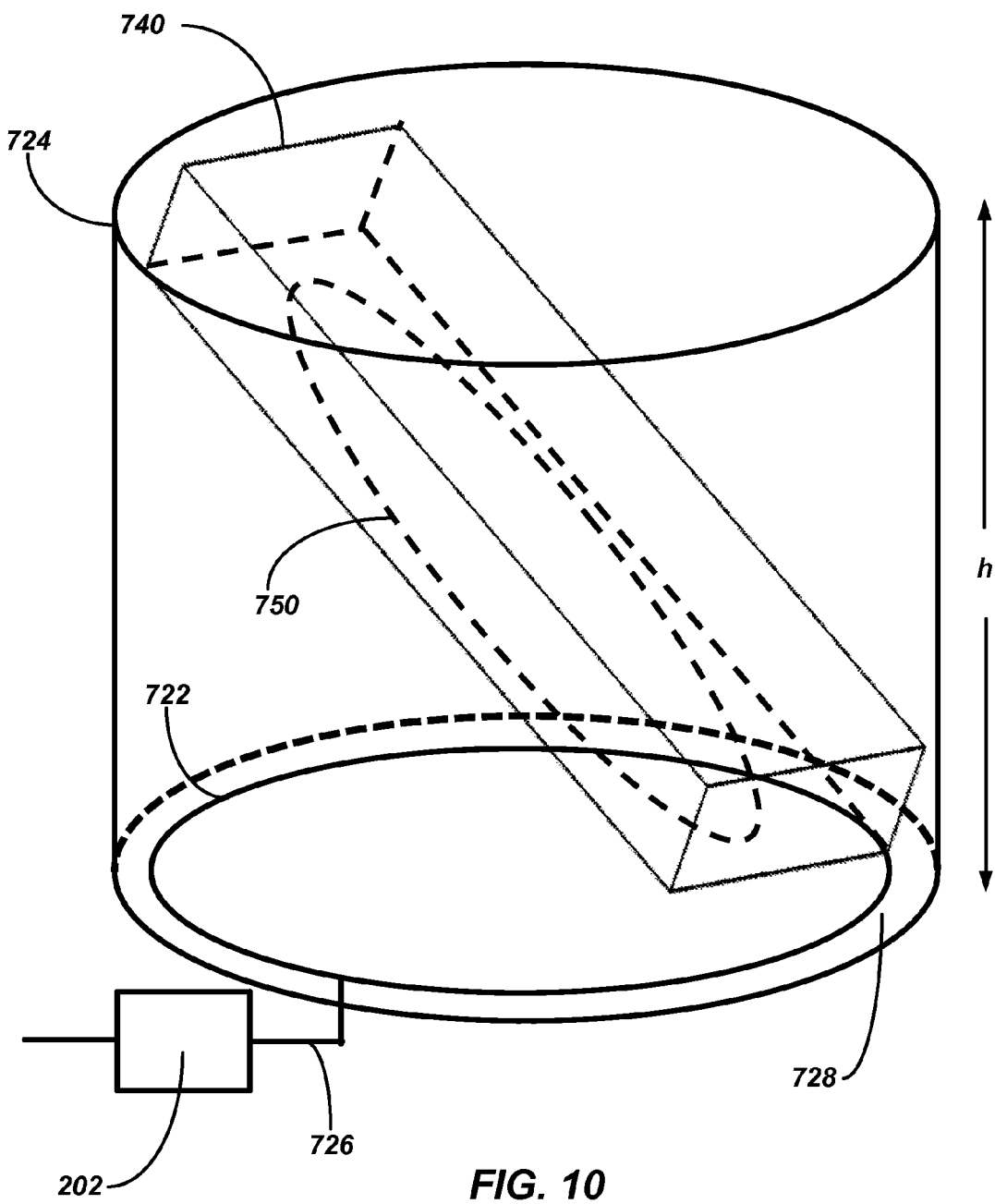
FIG. 10 illustrates a chargeable electronic device within a holder including a transmit antenna, according to an exemplary embodiment of the present invention.

FIG. 10 illustrates a cooperative arrangement between electronic device 740 and cup holder 724, in accordance with exemplary embodiments of the present invention. For wireless power charging, electronic device 740 is placed in cup holder 724 in an arrangement where the major dimension (i.e., height h dimension) and the minor plane 728 of the cup holder 724 provide mechanical support for retaining electronic device 740 in a substantially parallel orientation with cup holder 724. As observed with respect to FIG. 10, the transmit antenna 722 of cup holder 724 is illustrated as being in a substantially horizontal plane while receive antenna 750 of electronic device 740 is illustrated as being in a substantially orthogonal plane, namely a substantially vertical plane. Accordingly, the substantial orthogonal orientation between a transmit antenna 722 and the receive antenna 750 results in diminished coupling efficiency between the transmit antenna 722 and the receive antenna 750.

Figure 11:
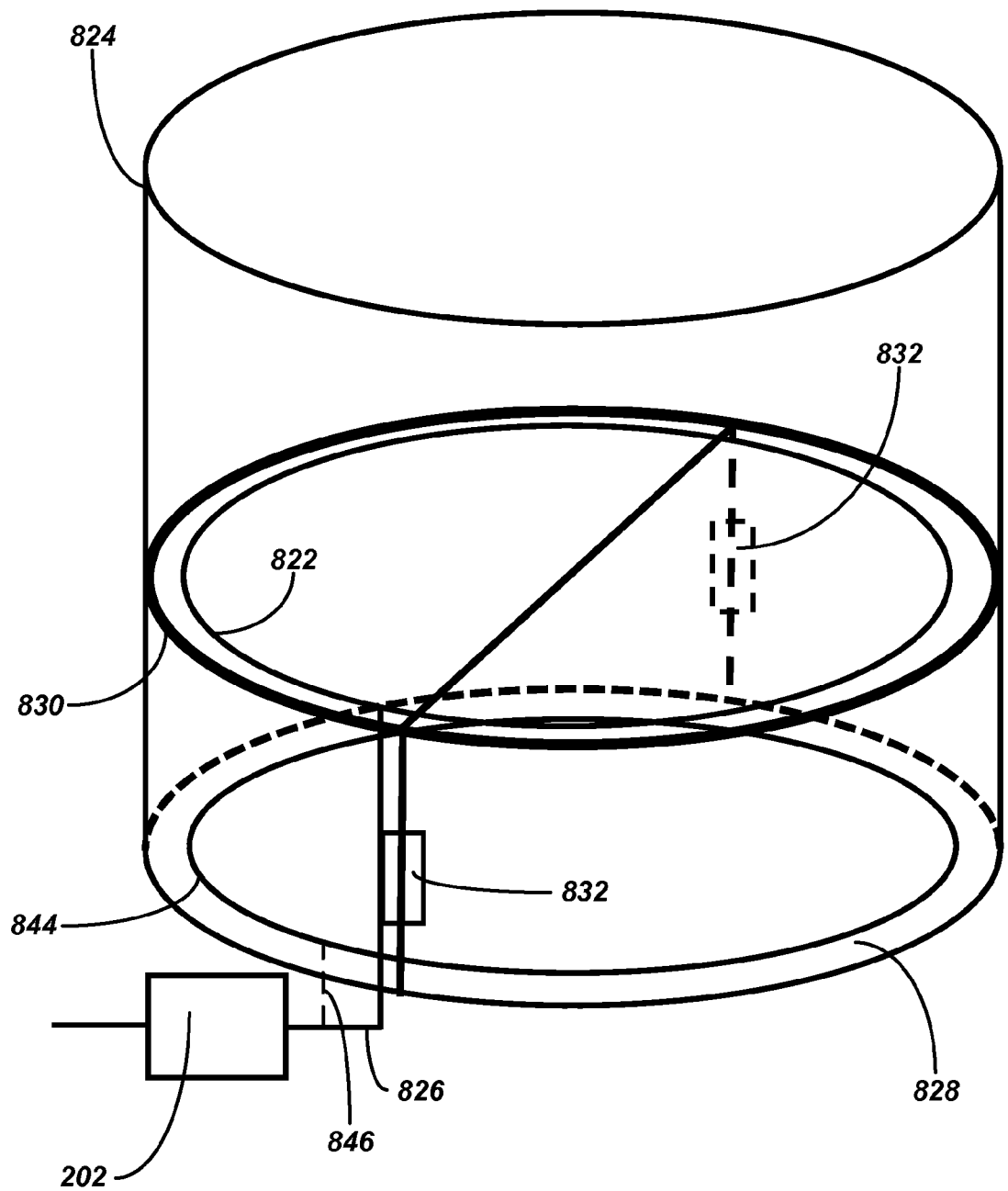
FIG. 11 illustrates a holder including a deflectable plate having at least one transmit antenna thereon, in accordance with an exemplary embodiment of the present invention.

FIG. 11 illustrates a cup holder for cooperatively transmitting wireless power, in accordance with exemplary embodiments of the present invention. As stated, acceptable wireless power transfer efficiency between a transmitter and receiver occurs when the transmit antenna and the receive antenna are relatively in parallel to ensure acceptable power transfer efficiency between the transmit circuitry and the receive circuitry. In various operating configurations due to the conventional dimensions of a cup holder and a handheld electronic device, it is not possible to lay the electronic device to be charged flatly on the transmit antenna surface.

In FIG. 11, a cup holder 824 is further configured to include a deflectable plate 830 configured within cup holder 824. Deflectable plate 830 is movable within cup holder 824 and is configured to deflect (i.e., reorient) in a plane that is out of parallel with minor plane 828 of cup holder 824. Deflectable plate 830 further includes a transmit antenna 822 coupled to feedline 826 which further couples to transmit circuitry, such as transmit circuitry 202 of FIG. 4. Deflectable plane 830 causes transmit antenna 822 to be oriented toward a plane that is less orthogonal to and more parallel with the plane of a receive antenna in an electronic device.

In one exemplary embodiment, deflectable plane 830 is maintained extended from minor plane 828 during non-use and then compresses nearer minor plane 828 during a conventional receipt of a non-chargeable device such as a cup or other similarly dimensioned device. Deflectable plane 830 may maintain a specific orientation within cup holder 824 by the use of one or more retention devices 832, which may comprise, individually or in combination, springs, liquid or gas shocks, magnetics, or other mechanical means such as by the use of counter weights affected by gravity or the like.

In another exemplary embodiment, cup holder 824 is an insertable sleeve that is capable of retrofitting existing or legacy holders such as a passive holder (e.g., conventional cup holder). The AC or DC input power provided to transmit circuitry 202 may be received, for example, from a conventional vehicular DC source such as a "cigarette lighter."

In yet another exemplary embodiment, transmit antenna 822 is configured as a repeater antenna (e.g., parasitic or passive antenna). In such an exemplary embodiment, a excitation transmitting antenna 844 driven by feedline 846 (feedline 826 is disconnected from transmit antenna 822 in this embodiment) from transmit circuitry 202 provides the field excitation that is then regenerated at passive transmit antenna 822 configured as a repeater antenna. In this exemplary embodiment, wireless power is transferred according to a near-field power transfer between two antennas through introduction of additional antennas into the system of coupled antennas that will act as repeaters and will enhance the flow of power from the transmitting antenna toward the receiving antenna. One or more extra antennas are used that couple to the transmit antenna and receive antenna in the system. These extra antennas comprise repeater antennas, such as active or passive antennas. A passive antenna may include simply the antenna loop and a capacitive element for tuning a resonant frequency of the antenna. An active element may include, in addition to the antenna loop and one or more tuning capacitors, an amplifier for increasing the strength of a repeated near-field radiation. A repeater antenna may refocus and reshape a coupling mode region from a transmit antenna to create a second coupling mode region around the repeater antenna, which may be better suited for coupling energy to a receive antenna.

Figure 12:
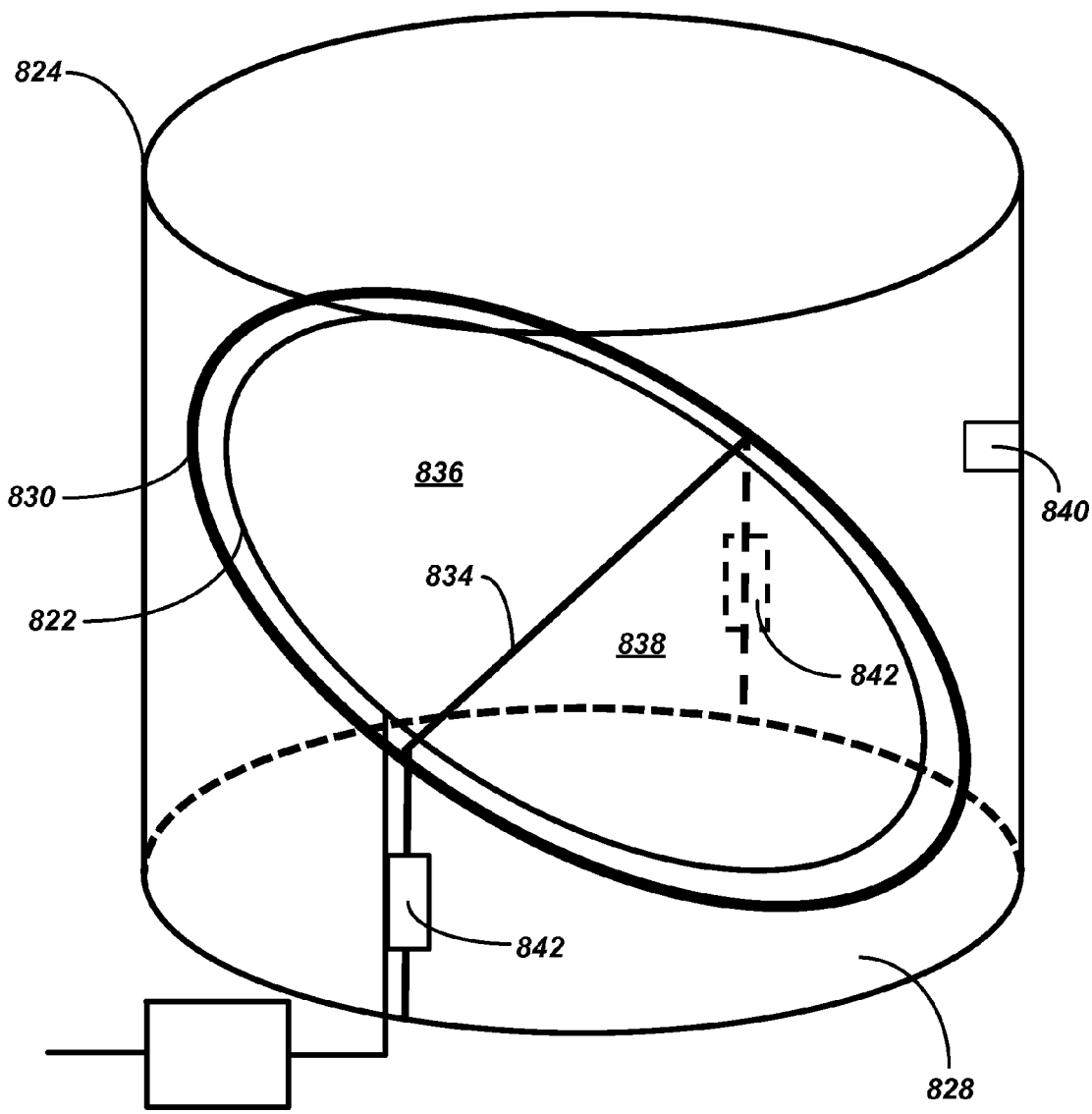
FIG. 12 illustrates a holder in a deflected position, according to an exemplary embodiment of the present invention.

FIG. 12 illustrates a cup holder in a deflected (i.e., reoriented) position, in accordance with an exemplary embodiment of the present invention. In cup holder 824, deflectable plate 830 in a state of deflection with respect to minor plane 828. By way of example and not limitation, deflectable plate 830 is illustrated as rotating or deflecting (i.e., reorienting) about an axis 834 with a portion 836 of the deflectable plane 830 deflecting or rotating in one direction (e.g., upward) and another portion 838 of deflectable plane 830 deflecting or rotating in an opposite direction (e.g., downward).

In other exemplary embodiments, axis 834 may be offset and even positioned on one end of deflectable plate 830 such that deflectable plate 830 functions as a "trap door" in that substantially the entire portions 836, 838 deflect (i.e., reorient) or rotate in the same direction. In one further exemplary embodiment, cup holder 824 may further include one or more springs 842 which may function to keep deflectable plane 830 extended from minor plane 828 when deflectable plane 830 is in a non-deflected position, as described above with reference to FIG. 11.

In yet another further exemplary embodiment, springs 842 may be configured to assist deflection (i.e., reorientation) or impede deflection (i.e., reorientation) of portions 836, 838 of deflectable plate 830. Furthermore, springs 842 may be rotational springs mounted about pivot points along the axis 834. In yet a further exemplary embodiment, one or more stops 840 may be included to strict excessive movement of deflection plate 830. In yet another further exemplary embodiment, axis 834 may be sufficiently offset from balancing portions 836 and 838 to allow gravity to maintain the non-deflected deflection plate 830 in a substantially parallel orientation with minor plane 828 when rotation of deflection plate 830 is restricted from over rotation by one or more stops 840.

Figure 13:
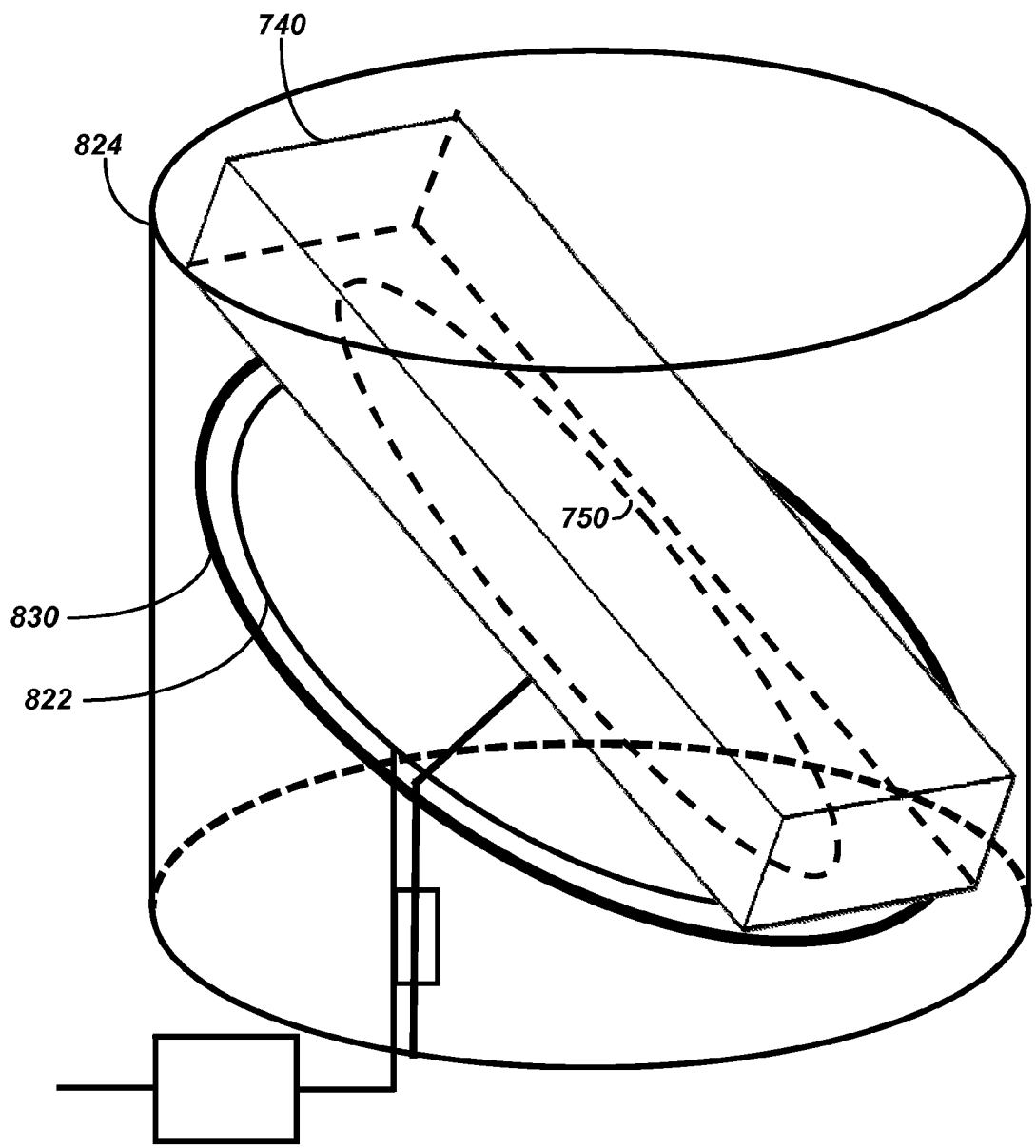
FIG. 13 illustrates a chargeable electronic device within a holder in a deflected position, in accordance with an exemplary embodiment of the present invention.

FIG. 13 illustrates a cooperative arrangement between electronic device 740 and cup holder 824, in accordance with exemplary embodiments of the present invention. For wireless power charging, electronic device 740 is placed in cup holder 824 causing the deflection or benefiting from the deflection (if deflection is initiated prior to the insertion of electronic device 740 in cup holder 824) of deflection plate 830, which causes the rotation of transmit antenna 822 in a plane that more closely parallels the plane of receive antenna 750 in electronic device 740. As stated above, arranging the transmit antenna 822 of the charging device and the receive antenna 750 of the electronic device 740 in a relatively parallel relationship improves the power transfer efficiency of wireless power transmission.

In one exemplary embodiment, deflection plate 830 partially deflects (i.e., reorients) in response to the insertion of electronic device 740 into cup holder 824 with cup holder 824 providing mechanical support to electronic device 740 inserted therein. In another exemplary embodiment, deflection plate 830 provides mechanical support to electronic device 740 within cup holder 824. As noted above, deflection plate 830 may not entirely deflect into a plane that is parallel with receive antenna 750, however, even partial deflection of transmit antenna 822 away from an orthogonal relationship with respect to receive antenna 750 results in an improved coupling and transmission of wireless power to electronic device 740.

Figure 14:
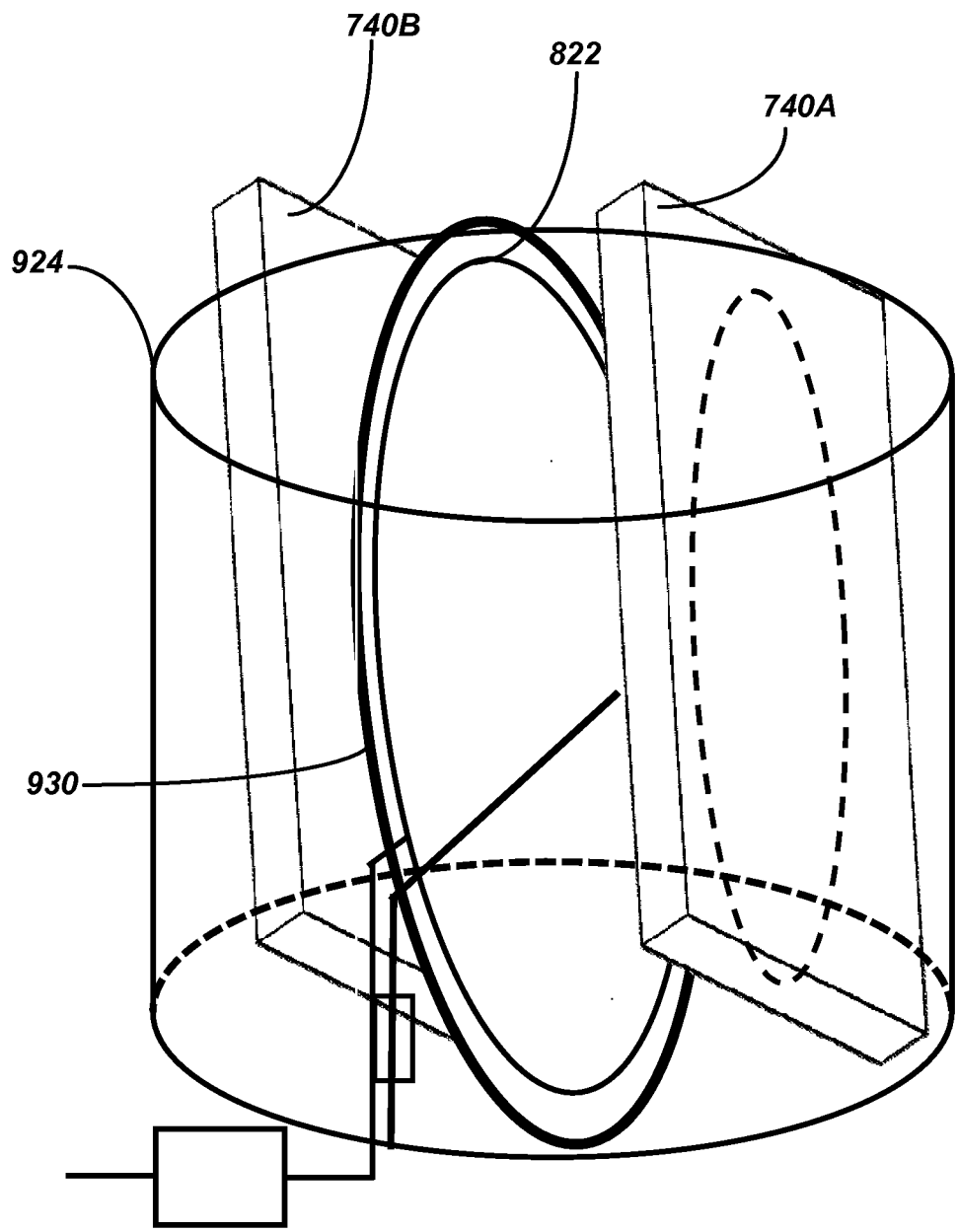
FIG. 14 illustrates a plurality of chargeable electronic devices within a holder in a deflected position, in accordance with an exemplary embodiment of the present invention.

FIG. 14 illustrates a cooperative arrangement of a plurality of electronic devices 740A, 740B and cup holder 924, in accordance with exemplary embodiments of the present invention. For wireless power charging, deflection plate 930 is configured within cup holder 924 to enable adequate deflection of deflection plate 930 to allow insertion of a plurality of electronic devices 740A, 740B for wireless power charging of the plurality of electronic devices 740A, 740B. In one exemplary embodiment, deflection plate 930 substantially equally partitions cup holder 924 into two portions for receiving two electronic devices 740A, 740B.

In other exemplary embodiments, the portions may be unequal within cup holder 924 to receive differently sized devices such as a larger electronic device 740A (e.g., mobile transceiver) and a smaller electronic device 740B (e.g., media player). In other exemplary embodiments, charging of electronic devices 740 may occur according to time domain or other charging profiles. Further exemplary embodiments may also include a deflection plate 930 including transmit antennas on both sides (not shown) of the deflection plate 930.

Figure 15:
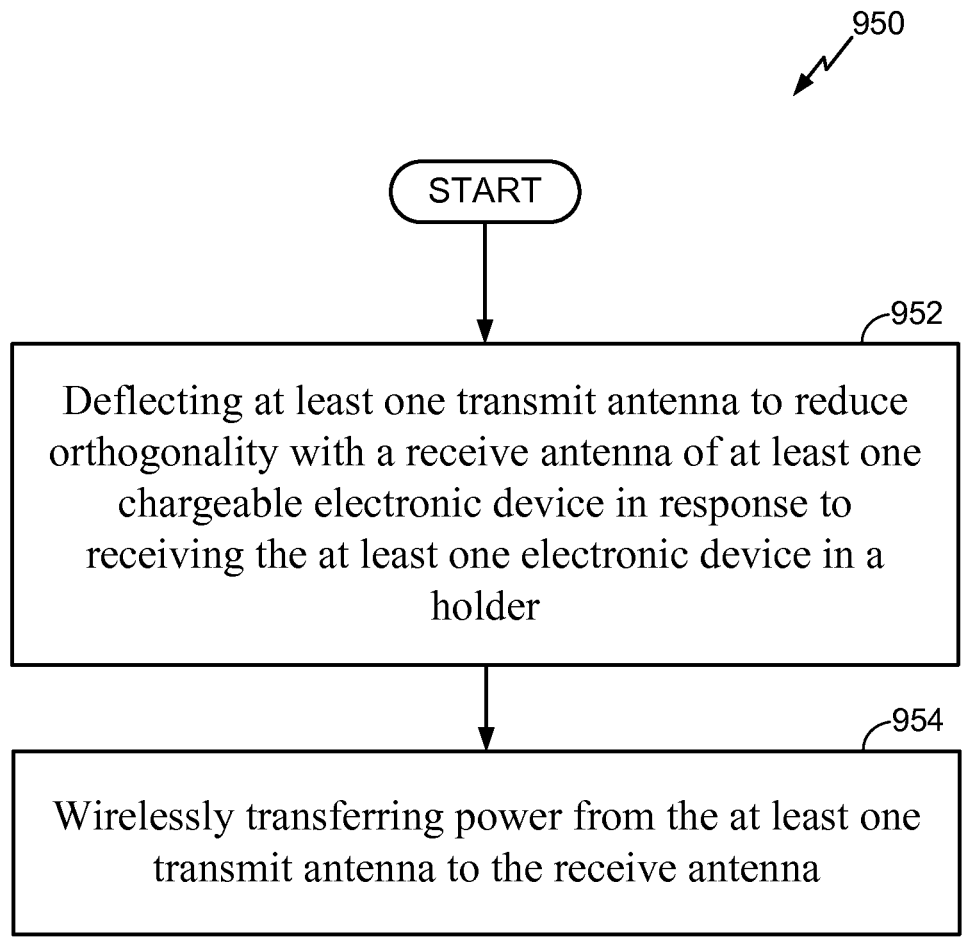
FIG. 15 is a flowchart illustrating another method, according to an exemplary embodiment of the present invention.

FIG. 15 is a flowchart illustrating a method 950, in accordance with one or more exemplary embodiments. Method 950 may include reorienting at least one transmit antenna to reduce orthogonality with a receive antenna of at least one chargeable electronic device in response to receiving the at least one electronic device in a holder (depicted by numeral 952). Method 950 may further include wirelessly transferring power from the at least one transmit antenna to the receive antenna (depicted by numeral 954).

Various exemplary embodiments of the invention have been described directed to a swingable or deflectable (i.e., reorientable) magnetically resonant antenna for wireless charging. These exemplary embodiments of the invention provide improvements for a wireless charging system where it is difficult to place the receive antenna on (or in parallel with) a fixed transmit antenna.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A wireless power charger, comprising:
   a retention device having a fixed base and configured to retain a chargeable device, the chargeable device comprising a receive antenna; and
   a deflection plate supported by the retention device and configured to support a transmit antenna, the deflection plate adjustable from a first position to a second position to reduce orthogonality between the transmit and the receive antenna.

2. The wireless power charger of claim 1, wherein the deflection plate is configured to mechanically deflect to change position.

3. The wireless power charger of claim 1, wherein the deflection plate pivots about an axis.

4. The wireless power charger of claim 3, wherein the deflection plate is configured to pivot to receive the chargeable device on a first side of the deflection plate and to receive a second chargeable device on a second side of the deflection plate.

5. The wireless power charger of claim 1, wherein the retention device is configured to impede movement of the deflection plate.

6. The wireless power charger of claim 3, wherein the axis is substantially symmetric within the container, and wherein the deflection plate substantially equally divides the retention device when the deflection plate is deflected.

7. The wireless power charger of claim 3, wherein the wireless power charger further comprises a second transmit antenna.

8. The wireless power charger of claim 3, wherein the axis is offset from a center of the deflection plate, and wherein the deflection plate is retained in a non-deflected position based on gravity.

9. The wireless power charger of claim 1, wherein the transmit antenna comprises a repeater antenna.

10. The wireless power charger of claim 1, wherein the retention device is configured to be placed within a passive container.

11. The wireless power charger of claim 10, wherein the passive container comprises a cup holder.

12. The wireless power charger of claim 1, wherein wireless power is transferred from the transmit antenna to the receive antenna.

13. The wireless power charger of claim 1, wherein a transmit power level of power to the transmit antenna is adjustable based upon a sensed load value.

14. The wireless power charger of claim 1, wherein the wireless power charger further comprises a container characterized by a first volume, and wherein the deflection plate is located within the container, and wherein the wireless power charger is configured to receive an object characterized by a second volume that is greater than or equal to the first volume.

15. The wireless power charger of claim 1, further comprising a cup holder, wherein the cup holder comprises the retention device.

16. The wireless power charger of claim 1, wherein the retention device is configured to enable movement of the deflection plate.

17. The wireless power charger of claim 1, wherein the wireless power is transferred using induction, and wherein the transmit antenna is configured to resonate at a frequency.

18. A method for wireless power charging using a wireless power charger, comprising:
adjusting a position of a deflection plate configured to support a transmit antenna, the deflection plate supported by a retention device, the retention device having a fixed base and configured to retain a chargeable device, from a first position to a second position to reduce orthogonality with a receive antenna of at least one chargeable electronic device; and
wirelessly transferring power from the transmit antenna to the receive antenna.

19. The method of claim 18, wherein adjusting the deflection plate comprises pivoting the deflection plate about an axis.

20. The method of claim 18, further comprising impeding movement of the deflection plate using the retention device.

21. The method of claim 18, further comprising receiving the chargeable device on a first side of the deflection plate and receiving a second chargeable device on a second side of the deflection plate.

22. The method of claim 18, wherein the wireless power charger comprises a second transmit antenna, the method further comprising wirelessly transferring power using the second transmit antenna.

23. The method of claim 18, wherein the transmit antenna comprises a repeater antenna.

24. The method of claim 18, further comprising inserting the retention device into a passive container.

25. The method of claim 18, wherein wirelessly transferring power comprises wirelessly transferring power using induction at a resonant frequency of the transmit antenna.

26. The method of claim 18, further comprising receiving an object in a container characterized by a first volume, the container comprising the transmit antenna and the object characterized by a second volume that is greater than or equal to the first volume.

27. The method of claim 18, further comprising:
sensing a load amount defined by a load of a wireless power charger; and
adjusting a power level based upon the load amount.

28. A wireless power charger, comprising:
means for adjusting a position of a deflection plate configured to support a transmit antenna, the deflection plate supported by a retention device, the retention device having a fixed base and configured to retain a chargeable device, from a first position to a second position to reduce orthogonality with a receive antenna of at least one chargeable electronic device; and
means for wirelessly transferring power from the at least one transmit antenna to the receive antenna.

29. The wireless power charger of claim 28, further comprising means for impeding movement of the deflection plate.

30. The wireless power charger of claim 28, further comprising means for receiving the chargeable device on a first side of the deflection plate and means for receiving a second chargeable device on a second side of the deflection plate.

31. The wireless power charger of claim 28, wherein the wireless power charger comprises a second transmit antenna, the wireless power charger further comprising means for wirelessly transferring power using the second transmit antenna.

32. The wireless power charger of claim 28, wherein the transmit antenna comprises a repeater antenna.

33. The wireless power charger of claim 28, further comprising means for inserting the retention device into a passive container.

34. The wireless power charger of claim 28, wherein wirelessly transferring power comprises means for wirelessly transferring power using induction at a resonant frequency of the transmit antenna.

35. The wireless power charger of claim 28, further comprising means for receiving an object in a container characterized by a first volume, wherein the deflection plate is located within the container, and wherein the object is characterized by a second volume that is greater than or equal to the first volume.

36. The wireless power charger of claim 28, further comprising:
means for sensing a load amount defined by a load of a wireless power charger; and
means for adjusting a power level based upon the load amount.

* * * * *